United States Patent Office 3,576,799
Patented Apr. 27, 1971

3,576,799
NON-SILVER PHOTOGRAPHIC SYSTEMS
Eugene Wainer, Shaker Heights, Ohio, assignor to Horizons Incorporated, a Division of Horizons Research Incorporated
No Drawing. Continuation-in-part of application Ser. No. 485,535, Sept. 7, 1965. This application Dec. 23, 1969, Ser. No. 887,732
Int. Cl. C09b 23/10
U.S. Cl. 260—240.1
4 Claims

ABSTRACT OF THE DISCLOSURE

Tri-nuclear heterocyclic compounds which yield a black image in a non-silver, free radical photographic system represented by the general formula

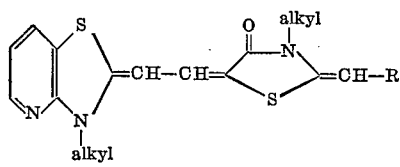

wherein R represents a carbocyclic or heterocyclic nucleus of the type common in cyanine dye chemistry.

---

This application is a continuation-in-part of U.S. patent application Ser. No. 485,535 filed Sept. 7, 1965, now issued as U.S. Pat. 3,486,898.

In that application, there are described non-silver photographic compositions which are sensitive to both ultraviolet and visible light which may either printout directly, thus requiring no development, or which may produce a semi-latent image which may be developed out by the application of infrared energy and which may be fixed by heating or by a solvent rinse and which has sufficient photographic speed to permit the use of a camera for the taking of pictures in a photographically significant time, such photographic speed representing a significant improvement over the teachings of the prior art.

In that application photosensitive compositions which were described included a combination of (1) color dye bases or secondary or tertiary aryl, heterocyclic, aryl-heterocyclic amines unsubstituted in a para position on the ring structure, or with components having a reactive position for attachment of a methane carbon atom or mixtures of these in combination with (2) leuco bases or carbinol bases of triarylmethane dyes of both simple and substituted character in which at least one of the aryl or substituted aryl groups of the triarylmethane leuco bases is specially treated to increase strongly its electrophilic or electron withdrawing characteristics, in photosystems including organic halogen compounds which generate free radicals on exposure to radiation of a suitable wavelength. Preferably the photosystem also includes a suitable base material in which the light sensitive material and the combination of synergistically acting agents are dispersed or on which they may be supported in the form of a thin film or coating, which coating may or may not contain a plastic binder.

In Examples 26 and 27 of that application a process was described using compounds having the following formulas in place of the styryl base compound utilized in Example 1 of the application whereby a permanent black image was obtained:

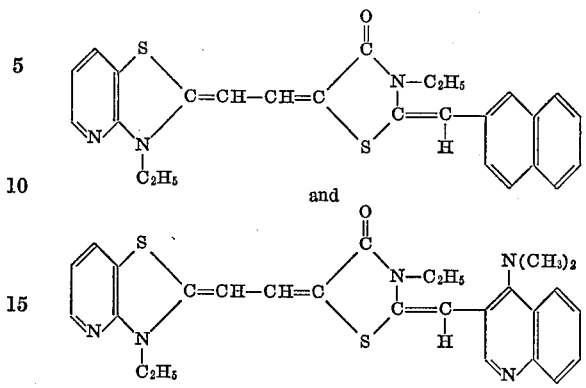

The invention will be more clearly understood from the description which follows which incorporates Example 1 of said patent application as background material.

EXAMPLE 1 (PARENT APPLICATION)

When 3 milligrams of the styryl base, 4-p-dimethyl-aminostyrylquinoline, and 25 milligram of the leuco base, 4-4'-bis(dimethylamino)2",6" dichlorotriphenylmethane, were dissolved in 10 cc. of ethyl acetate containing 700 milligrams of carbon tetrabromide, then coated on a clear or pigmented cellulose acetate substrate, excellent images were obtained on exposure in a camera for 1 second at F 4.5 in bright sunlight after infrared treatment with radiation in a wavelength range between 0.75 and 3.0 microns for 2 minutes. The image obtained was background clarified and fixed by bathing in a solvent solution consisting of 3 parts of ethyl acetate and 17 parts of benzene which removed the unreacted starting materials.

EXAMPLES 26 AND 27 (PARENT APPLICATION)

The process of Example 1 was repeated using 3 mg. of compounds having the formula

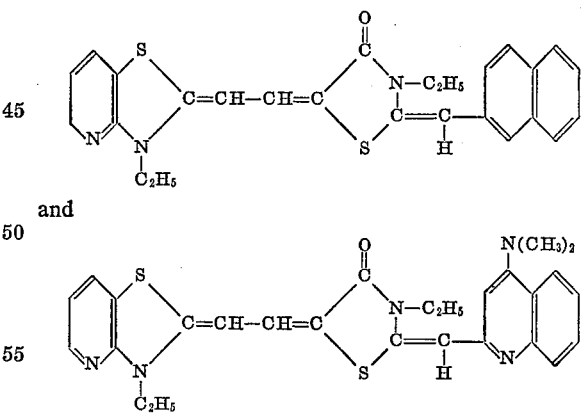

in place of the 3 mg. of styryl base compound and in each instance a permanent black image was obtained.

This application is directed to the compounds themselves which were originally the subject of claims 25 and 26 of application Ser. No. 485,535.

Examples A and B which follow are intended to be illustrative of the preparation of compounds similar to the compounds claimed in claims 25 and 26 of application Ser. No. 485,535.

EXAMPLE A

Preparation of 3-ethyl-5[(3 - ethyl - 2(3H)-thiazolo-[4,5-b]-pyridylidene) ethylidene] - 2 - (4-dimethylamino-2-quinolylmethylene)-4-thiazolidone

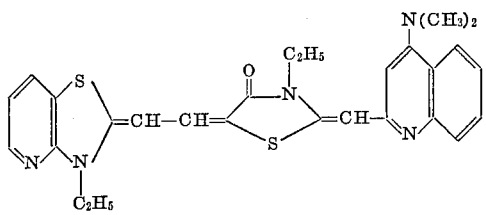

To 30 g. (0.20 mole) of 2 - methylthiazolo[4,5-b]-pyridine (prepared according to the procedure of T. Takahashi, et al., J. Pharm. Soc. Japan, 64, 235, (1944)) was added 31.2 g. (0.20 mole) of ethyl iodide. The resulting mixture was heated to reflux for 12 hours. The reaction mixture was then chilled and filtered to collect the solid. The recovered solid was washed with three 10 ml. portions of acetone and dried in vacuo, yielding 30.6 g. of crude 2 - methylthiazolo [4,5-b]-pyridine ethiodide.

This salt was added to 19.6 g. (0.10 mole) of N,N'-diphenylformamidine in 100 ml. of acetic anhydride. The mixture was boiled for 15 minutes, then chilled to precipitate 2 - [beta-(N-phenylacetamido)ethylidenyl]-thiazolo [4,5-b]-pyridine ethiodide. To 27.1 g. of the latter was added 9.7 g. (0.06 mole) of 3 - ethylrhodanine, 10.1 g. (0.10 mole) of triethylamine and 200 ml. of ethanol. The resulting mixture was boiled for 30 minutes and then chilled. 28.9 g. of 5-[(3-ethyl-2 (3H)-thiazolo [4,5-b]-pyridylidene)-ethylidene] - 3 - ethyl rhodanine was recovered from the chilled mixture. The said substituted rhodanine was heated for 8 hours at 100° C. in the presence of 30.1 g. (0.16 mole) of methyl p-toluenesulfonate. The resulting mixture was chilled and slurried in 200 ml. of acetone. The solid was collected by suction filtration, dried for 4 hours at 75° C. and then added to 6.0 g. (0.032 mole) of 4 - dimethylaminoquinaldine and 3.2 g. (0.32 mole) of triethylamine in 500 ml. of ethanol. The mixture was boiled for 5 hours, then filtered while hot. The filtrate was concentrated in vacuo to a dark red oil which was dissolved in 50 ml. of methanol. The methanolic solution was poured slowly, with stirring, onto crushed ice and the resulting solid was collected by suction filtration. The solid was treated with 6 N hydrochloric acid and filtered. The acidic solution was chilled and made alkaline with 12 N sodium hydroxide solution. This solid was recrystallized from aqueous methanol to give 4.7 g. of a red dye, M.P. 217–220° C. with decomposition.

*Analysis.*—Calcd. for $C_{27}H_{27}N_5OS_2$ (percent): C, 64.64; H, 5.42; N, 13.78. Found (percent): C, 64.29; H, 5.13; N, 13.60; S, 13.20. $\lambda_{max.}=460$ Nm.

The 4 - dimethylaminoquinaldine used in this preparation was prepared from 4-amino-quinaldine by utilization of the procedure described by R. N. Icke et al. (Org. Syn. Coll. vol. 3, 723). The product was obtained in 60% yield and had M.P. 262–264° C.

*Analysis.*— Calcd. for $C_{12}H_{14}N_2$ (percent): C, 77.38; H, 7.58; N, 15.04. Found (percent): C, 77.02; H, 7.29; N, 15.38.

EXAMPLE B 3-ethyl - 5 - [(3 - ethyl - 2(3H)-thiazolo [4,5-b]-pyridylidene)ethylidene] - 2 - (2 - naphthylmethylene)-4-thiazolidone

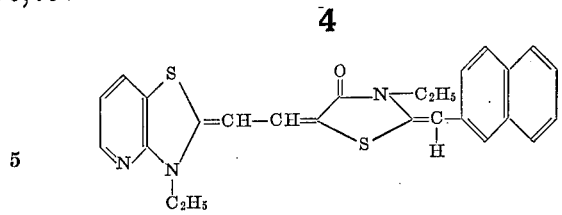

The procedure in Example A was utilized, except that 2 - naphthylacetonitrile was used in place of 4-dimethylaminoquinaldine to give 3-ethyl-5[(3 - ethyl - 2(3H)-thiazolo [4,5-b]-pyridylidene)ethylidene] - 2 - (2 - naphthylcyanomethylene) - 4 - thiazolidone. The latter was hydrolyzed and decarboxylated by heating 1.0 g. of it in 200 ml. of 80% sulfuric acid for 20 minutes on a steam bath. The mixture was removed and then brought rapidly to a boil for 30 seconds. The mixture was chilled, neutralized with sodium hydroxide, filtered and the solid was dried. The solid was dissolved in 200 ml. of chloroform and purified by chromatography on an alumina column. The product was recovered in acetone and concentrated to dryness to give 0.3 g. of brown-red dye, M.P. 231–233° C. with decomposition.

*Analysis.*—Calcd. for $C_{26}H_{23}N_3OS_2$ (percent): C, 68.24; H, 5.07; N, 9.18; S, 14.01. Found (percent): C, 68.59; H, 4.79; N, 9.54; S, 13.67. $\lambda_{max.}=440$ Nm.

EXAMPLE C 3-ethyl - 5 - [(3 - ethyl - 2(3H) - thiazolo[4,5-b]-pyridylidene)ethylidene] - 2 - (2 - quinolylmethylene)-4-thiazolidone

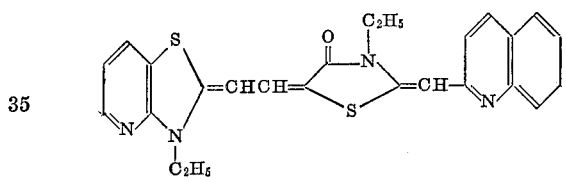

The procedure in Example A was utilized, except that 2 - quinolylacetonitrile was used in place of 4 - dimethylaminoquinaldine to give 3 - ethyl - 5[(3 - ethyl - 2(3H)-thiazolo[4,5-b]-pyridylidene)ethylidene] - 2 - (2 - quinolylcyanomethylene) - 4 - thiazolidone. The latter was hydrolyzed and decarboxylated by heating 1.0 g. of it in 200 ml. of 80% sulfuric acid for 30 minutes on a steam bath. The mixture was then boiled for 2 minutes, chilled, neutralized with aqueous caustic, filtered and the solid was dried. The solid was dissolved in chloroform and purified by chromatography on an alumina column. The product was recovered in acetone and the solvent was evaporated to dryness to give .2 g. of brown-red dye, M.P. 227–230° C. with decomposition.

*Analysis.*—Calcd. for $C_{25}H_{22}N_4OS_2$ (percent): C, 65.48; H, 4.84; N, 12.22; S, 13.98. Found (percent): C, 65.06; H, 4.75; N, 12.06; S, 13.61. $\lambda_{max.}=450$ Nm.

It will be apparent that other substituted thiazolidones than those specifically described may be prepared by making suitable changes in the reactants.

A general formula for the novel compounds of this invention is as follows:

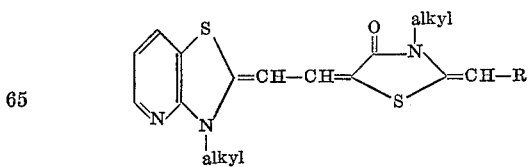

wherein R is selected from the group consisting of carbocyclic and heterocyclic nuclei including benzyl, naphthyl, 2-quinolyl, 2-pyridyl, imidazole, benzimidazole, 4-pyridyl, benzoselenazole, 4-quinolyl, benzothiazole, benzooxazole, thiazole, selenazole, oxazole, thiazoline, B-naphthothiazole and B-naphthooxazole, and each alkyl group is selected from methyl and ethyl.

I claim:
1. A compound represented by the general formula

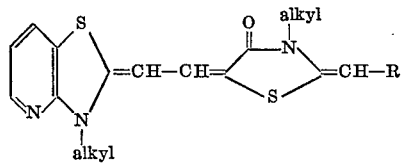

wherein each alkyl is an alkyl group with up to 4 carbon atoms and R represents a carbocyclic or heterocyclic nucleus used in cyanine dye chemistry and is selected from the group consisting of benzyl, naphthyl, 2-quinolyl, 2-pyridyl, imidazole, benzimidazole, 4-pyridyl, benzoselenazole, 4-quinolyl, benzothiazole, benzooxazole, thiazole, selenazole, oxazole, thiazoline, B-naphthothiazole and B-naphthooxazole.

2. The compound having the formula

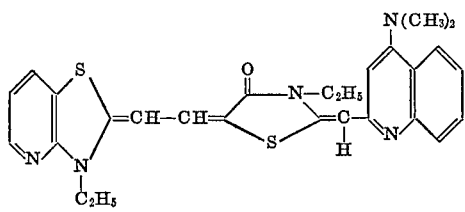

3. The compound having the formula

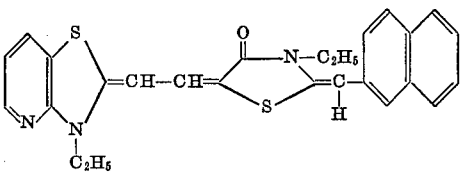

4. The compound having the formula

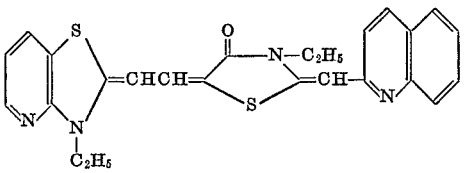

References Cited
UNITED STATES PATENTS 2,454,629   11/1948   Brooker _____ 260—240

OTHER REFERENCES

Chemical Abstracts I, vol. 45, cols. 8529 to 8532 (1951)) abstract of Takahashi et al.).

Chemical Abstracts II, vol. 51, cols. 8725 to 8726 (1957) (abstract of Kiprianov et al.).

JOHN D. RANDOLPH, Primary Examiner

U.S. Cl. X.R.

96—90; 260—240.4